United States Patent
Ishibashi et al.

(10) Patent No.: US 11,117,463 B2
(45) Date of Patent: Sep. 14, 2021

(54) UTILITY VEHICLE

(71) Applicant: KAWASAKI JUKOGYO KABUSHIKI KAISHA, Hyogo (JP)

(72) Inventors: Kazuki Ishibashi, Kobe (JP); Takashi Hisamura, Akashi (JP)

(73) Assignee: KAWASAKI JUKOGYO KABUSHIKI KAISHA, Hyogo (JP)

(*) Notice: Subject to any disclaimer, the term of this patent is extended or adjusted under 35 U.S.C. 154(b) by 70 days.

(21) Appl. No.: 16/592,045

(22) Filed: Oct. 3, 2019

(65) Prior Publication Data
US 2021/0101469 A1    Apr. 8, 2021

(51) Int. Cl.
| | |
|---|---|
| *B60K 11/04* | (2006.01) |
| *B62D 25/20* | (2006.01) |
| *B60N 2/24* | (2006.01) |
| *B60K 5/00* | (2006.01) |
| *B62D 25/08* | (2006.01) |

(52) U.S. Cl.
CPC .......... *B60K 11/04* (2013.01); *B62D 25/2036* (2013.01); *B60K 2005/003* (2013.01); *B60N 2/24* (2013.01); *B60Y 2200/20* (2013.01); *B62D 25/085* (2013.01)

(58) Field of Classification Search
CPC .............. B60K 11/04; B60K 2005/003; B62D 25/2036
See application file for complete search history.

(56) References Cited

U.S. PATENT DOCUMENTS

| | | | | |
|---|---|---|---|---|
| 6,902,449 | B1* | 6/2005 | Faucheux | B63H 5/125 440/57 |
| 2004/0195019 | A1* | 10/2004 | Kato | B60K 13/02 180/68.3 |
| 2004/0216942 | A1* | 11/2004 | Tanaka | B60K 5/04 180/292 |
| 2004/0231900 | A1* | 11/2004 | Tanaka | B60K 13/02 180/68.3 |
| 2014/0265285 | A1* | 9/2014 | Erspamer | B60N 2/68 280/783 |
| 2015/0047917 | A1* | 2/2015 | Burt, II | B60K 5/00 180/292 |
| 2015/0367891 | A1* | 12/2015 | Deschamps | B62D 31/003 280/781 |
| 2017/0174027 | A1* | 6/2017 | Mailhot | B62D 3/12 |
| 2018/0272858 | A1 | 9/2018 | Tsumiyama et al. | |

* cited by examiner

*Primary Examiner* — James A Shriver, II
*Assistant Examiner* — Michael T. Walsh
(74) *Attorney, Agent, or Firm* — Wenderoth, Lind & Ponack, L.L.P.

(57) ABSTRACT

A utility vehicle includes a vehicle interior, a front panel that defines a front side of the vehicle interior and extends in a vertical direction, a floor panel that defines a lower side of the vehicle interior and extends from a lower side of the front panel to a rear side, and is provided with a tunnel portion extending in a front-rear direction on a center side in a vehicle width direction, a propeller shaft that is disposed in the front-rear direction in the tunnel portion and extends to a front side with respect to the front panel, and a cover member that covers space between the propeller shaft and the tunnel portion on a front side of the tunnel portion.

13 Claims, 10 Drawing Sheets

UTILITY VEHICLE

BACKGROUND OF THE INVENTION

Field of the Invention

The present invention relates to a utility vehicle.

Description of Related Art

In a utility vehicle, power is transmitted from an engine disposed at the rear of a vehicle body to a differential disposed at the front of the vehicle body by a propeller shaft. For example, as described in U.S. Patent Application Publication No. 2018/272858 A1, a propeller shaft disposed in a tunnel portion provided on the center side in the vehicle width direction of a floor panel transmits power from an engine disposed at the rear of a vehicle body to a differential disposed at the front of the vehicle body.

SUMMARY OF THE INVENTION

In a utility vehicle in which a propeller shaft is disposed in a tunnel portion provided on a floor panel, a foreign matter, such as mud and stones, may be sprung by a front wheel or the like during traveling and may enter the tunnel portion from the front side and accumulate. In particular, in a case where a steering angle of the front wheel is large, a foreign matter easily enters the tunnel portion from the front side and accumulates. A foreign matter that enters the tunnel portion from the front side and accumulates may cause damage to the propeller shaft or increase in weight.

In view of the above, an object of the present invention is to suppress a foreign matter from entering a tunnel portion from the front side and accumulating in a utility vehicle in which a propeller shaft is disposed in the tunnel portion provided on a floor panel.

In order to achieve the above object, according to the present invention, there is provided a utility vehicle including a vehicle interior, a front panel that defines a front side of the vehicle interior and extends in a vertical direction, a floor panel that defines a lower side of the vehicle interior and extends from a lower side of the front panel to a rear side, and is provided with a tunnel portion extending in a front-rear direction on a center side in a vehicle width direction, a propeller shaft that is disposed in the front-rear direction in the tunnel portion and extends to a front side with respect to the front panel, and a cover member that covers space between the propeller shaft and the tunnel portion or a front side of the tunnel portion.

According to the present invention, since the front side of the tunnel portion is covered by the cover member, a foreign matter, such as mud and stones, that is sprung by the front wheel and the like during traveling can be suppressed from entering the tunnel portion from the front side and accumulating. In particular, in a case where a steering angle of the front wheel is large, a foreign matter can be suppressed from entering the tunnel portion and accumulating. Further, an increase in the temperature of the floor panel due to air including hot air from the radiator on the front side flowing into the tunnel portion can be suppressed, and the thermal effect on the passenger can be suppressed. Further, damage to the propeller shaft due to a foreign matter, such as stones, entering the tunnel portion can be suppressed.

In an aspect of the present invention, the cover member is provided so as to be substantially flush with the front panel.

According to the present aspect, since the cover member is provided substantially flush with the front panel, a foreign matter can be effectively suppressed from entering the tunnel portion and accumulating. Further, air including hot air from the radiator on the front side can be moved to an outer side in the vehicle width direction, the lower side, and the like of the front panel so as to be suppressed from flowing into the tunnel portion.

In an aspect of the present invention, the cover member covers substantially entire space between the propeller shaft and the tunnel portion on the front side of the tunnel portion.

According to the present aspect, the cover member can effectively suppress a foreign matter from entering the tunnel portion from the front side and accumulating, and also effectively suppress air including hot air from the radiator on the front side from flowing into the tunnel portion from the front side.

In an aspect of the present invention, a cable extending in the front-rear direction is routed in the tunnel portion, and the cover member is provided with a cable recess through which the cable is inserted in the front-rear direction and locked.

According to the present aspect, the cable can be locked using the cover member without the need of separately providing a component for locking the cable extending in the front-rear direction in the tunnel portion.

DETAILED DESCRIPTION OF THE PREFERRED EMBODIMENT

Hereinafter, a utility vehicle according to an embodiment of the present invention will be described with reference to the accompanying drawings. A utility vehicle is mainly a vehicle for traveling not only on grassland, gravel, and sand, but also on unpaved mountain roads and forest roads, and off roads, such as muddy and rocky lands. Note that, in the present description, "front", "rear", "left", and "right" refer to a front direction, a rear direction, a left direction, and a right direction as viewed from a passenger on the utility vehicle.

Figure 1:
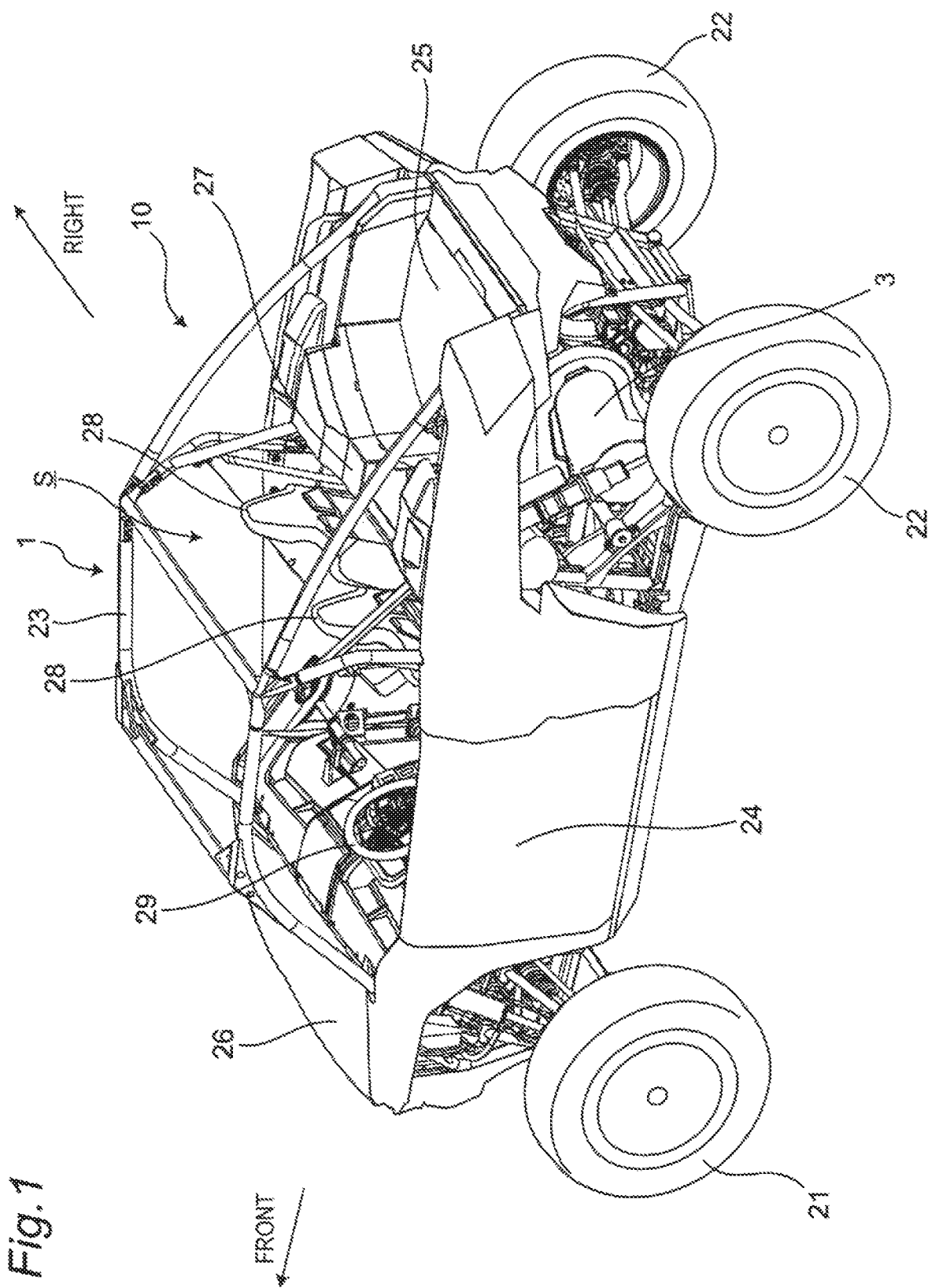
FIG. 1 is a perspective view of a utility vehicle according to an embodiment of the present invention.
Figure 2:
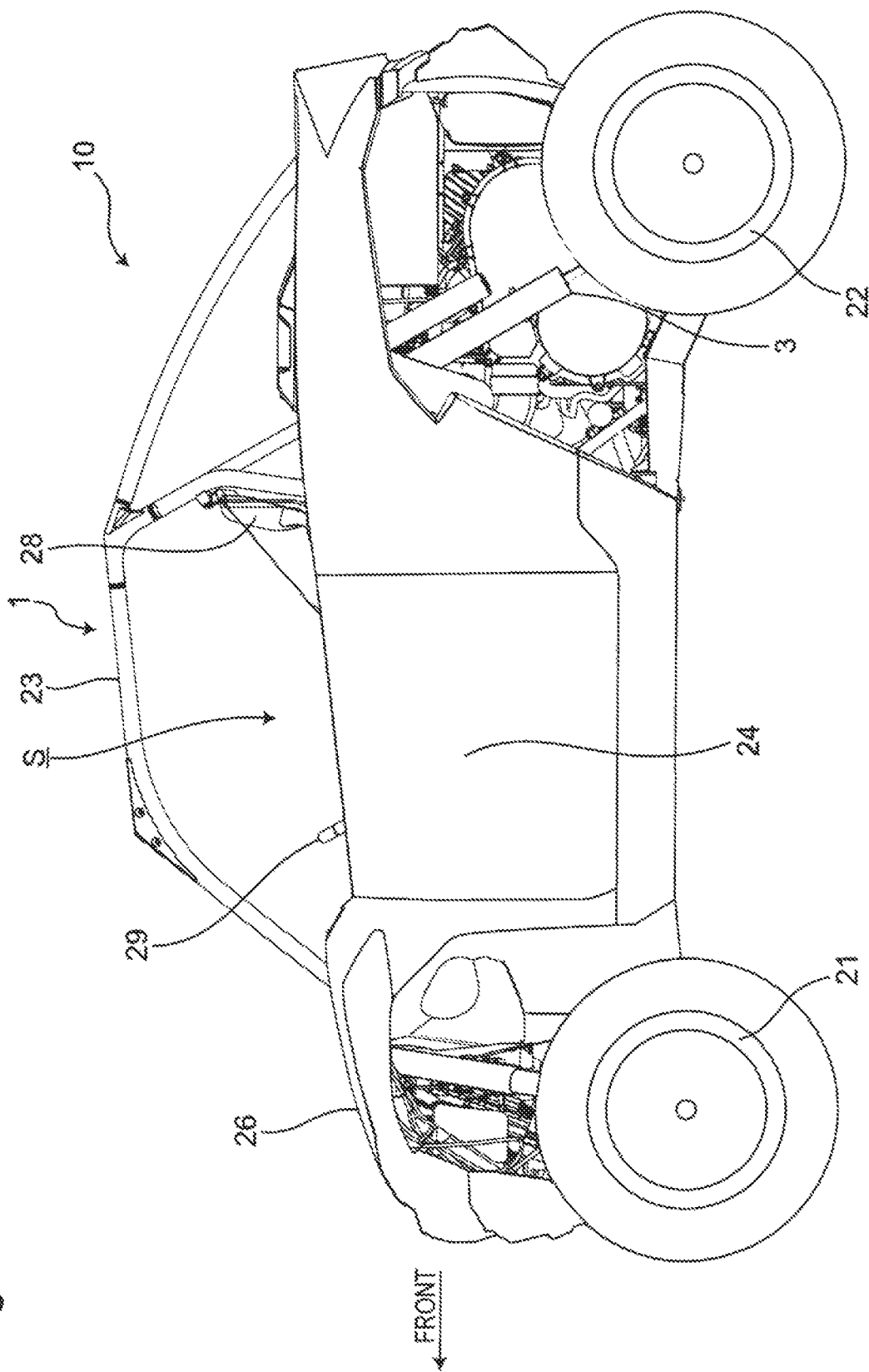
FIG. 2 is a side view of the utility vehicle.

FIG. 1 is a perspective view of a utility vehicle according to an embodiment of the present invention, and FIG. 2 is a side view of the utility vehicle. As shown in FIGS. 1 and 2, a utility vehicle 10 includes a pair of left and right front wheels 21 at the front of a vehicle body and a pair of left and right rear wheels 22 at the rear of the vehicle body, and includes riding space (cabin) S, which is a vehicle interior that a passenger gets in, between the front wheels 21 and the rear wheels 22.

The riding space S is surrounded by a ROPS 23, a pair of left and right doors 24, a back panel 27, and a floor panel 40 and a front panel 30 which will be described later. The ROPS 23 is an abbreviation for rollover protection structure and is part of a vehicle body frame 1.

A cargo bed 25 is provided behind the riding space S, and a hood 26 is provided in front of the riding space S. Furthermore, a back panel 27 is provided at the front end of the cargo bed 25 to define the cargo bed 25 and the riding space S.

In the riding space S, a pair of left and right independent seats 28 are installed. An operation unit such as a steering wheel 29 is provided in front of the seat 28.

A power unit 3 is disposed below the cargo bed 25 at the rear of the vehicle body. The power unit 3 includes an engine, a transmission, and a rear wheel differential. A driving force of the engine is transmitted to the transmission. The transmission transmits the power from the engine to the left and right rear wheels 22 via the rear wheel differential. The transmission also transmits power from the engine to the left and right front wheels 21 via a propeller shaft extending in a front-rear direction of the vehicle body and a front wheel differential disposed at the front of the vehicle body.

Figure 3:
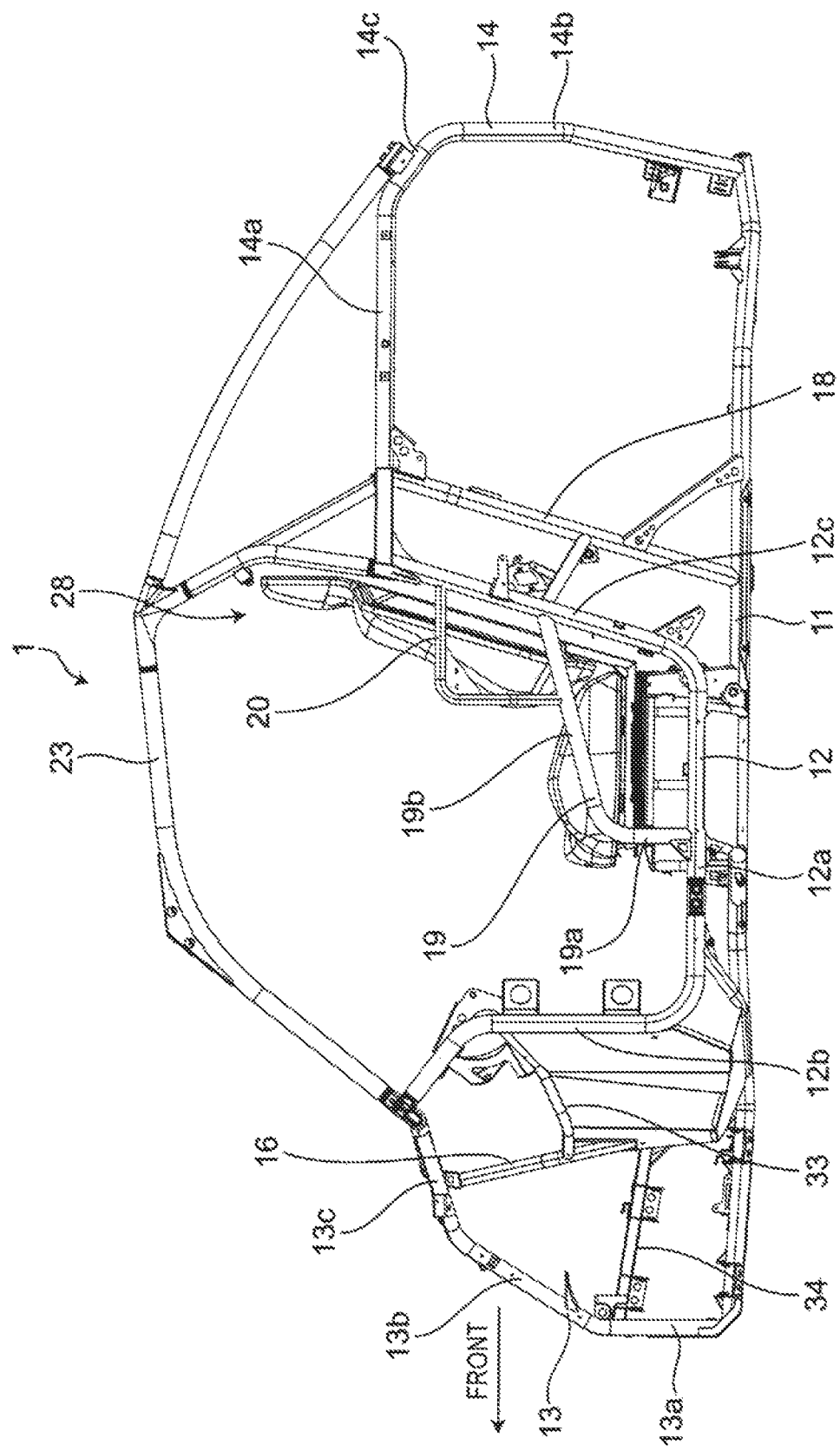
FIG. 3 is a side view of a vehicle body frame.
Figure 4:
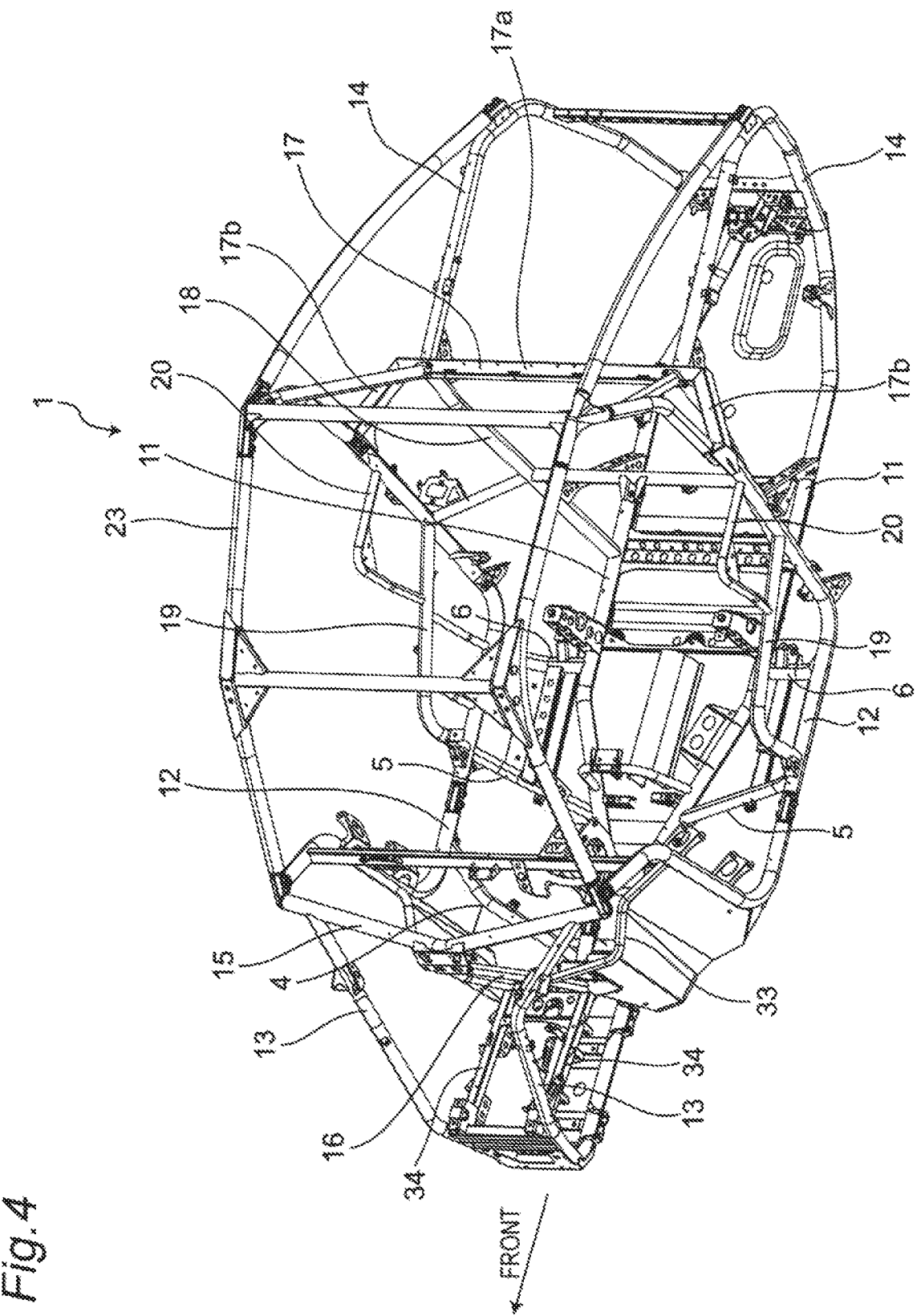
FIG. 4 is a perspective view of the vehicle body frame.

FIG. 3 is a side view of the vehicle body frame, and FIG. 4 is a perspective view of the vehicle body frame. As shown in FIGS. 3 and 4, the vehicle foody frame 1 includes a pair of left and right main frames 11, a pair of left and right side frames 12, a pair of left and right front frames 13, and a pair of left and right rear frames 14.

The main frame 11 forms a skeleton of the vehicle body frame 1 and extends in the front-rear direction. The side frame 12 is provided on the side of the main frame 11. The front frame 13 is provided at the upper front of the main frame 11. The rear frame 14 is provided at the upper rear of the main frame 11.

The main frames 11, the side frames 12, the front frames 13, and the rear frames 14 are provided substantially symmetrically in a vehicle width direction that is a left-right direction. At least one cross member is provided between the left and right main frames 11, between the main frame 11 and the side frame 12, between the left and right front frames 13, and between the left and right rear frames 14. The frames are connected by the cross member in the vehicle width direction, so that the rigidity in the vehicle width direction or the vehicle body frame 1 is increased.

The side frame 12 is located on an outer side in the vehicle width direction with respect to the main frame 11, and is connected to the main frame 11 by a plurality of cross members, specifically, a first cross member 4, a second cross member 5, and a third cross member 6 disposed in a manner separated in the front-rear direction. The side frame 12 extends in the front-rear direction as a whole, and has a substantially U shape in a side view.

The front frame 13 includes a front vertical frame portion 13a, a first oblique frame portion 13b, and a second oblique frame portion 13c. The front vertical frame portion 13a extends in a vertical direction, which is a vehicle body height direction. The first oblique frame portion 13b extends from the upper end of the front vertical frame portion 13a so as to incline rearward toward the upper side. The second oblique frame portion 13c extends from the upper end of the first oblique frame portion 13b so as to incline rearward toward the upper side and outward in the vehicle width direction.

The lower end or the front vertical frame portion 13a is fixed to the front end of the main frame 11 by welding or the like. The upper end of the second oblique frame portion 13c is fixed to a front cress member 15 by welding or the like. The front cross member 15 extends in the vehicle width direction and has a substantially V shape when viewed from the front of the vehicle body. The front cross member 15 is supported by a pair of left and right front support frames 16 erected obliquely forward at the front of the main frame 11.

The rear frame 14 is located at the rear of the vehicle body frame 1. The rear frame 14 extends in the front-rear direction as a whole, and has a substantially L shape when viewed from the side of the vehicle body. The rear frame 14 includes a rear upper frame portion 14a, a rear vertical frame portion 14b, and a rear curved frame portion 14c.

The rear upper frame portion 14a extends in the front-rear direction. The rear vertical frame portion 14b extends downward so as to incline inward in the vehicle width direction. The rear curved frame portion 14c is curved so as to connect the rear upper frame portion 14a and the rear vertical frame portion 14b. In the rear frame 14, the lower end of the rear vertical frame portion 14b is fixed to the rear end of the main frame 11 by welding or the like. The front end of the rear upper frame portion 14a is fixed to a rear cross member 17 by welding or the like.

The rear cross member 17 includes a rear horizontal bar portion 17a and left and right rear oblique bar portions 17b. The rear horizontal bar portion 17a is located at the center of the rear cross member 17, and extends in the vehicle width direction. The rear oblique bar portion 17b is located on the side of the rear horizontal bar portion 17a and extends forward so as to incline outward in the vehicle width direction. The rear horizontal bar portion 17a is supported by a pair of left and right rear support frames 18 that extend upward so as to incline rearward in the center portion in the front-rear direction of the main frame 11.

The side frame 12 includes a lower end portion 12a that is located at the bottom and extends in the front-rear direction, a front portion 12b extending upward and forward from the front end of the lower end portion 12a, and a rear portion 12c extending upward from the rear end of the lower end portion 12a. The side frame 12 is provided with a subframe 19 that connects an intermediate portion in the front-rear direction of the lower end portion 12a and an intermediate portion in the vertical direction of the rear portion 12c.

The subframe 19 includes a front portion 19a that extends upward from the intermediate portion in the front-rear direction of the lower end portion 12a of the side frame 12, and a rear portion 13b that extends rearward from the upper end of the front portion 19a in a manner inclined upward and is connected to the intermediate portion in the vertical direction of the rear portion 12c of the side frame 12. The subframe 19 is provided with an upper subframe 20 that connects an intermediate portion in the front-rear direction of the rear portion 19b of the subframe 19 and a portion above the subframe 19 in the rear portion 12c of the side frame 12.

Figure 5:
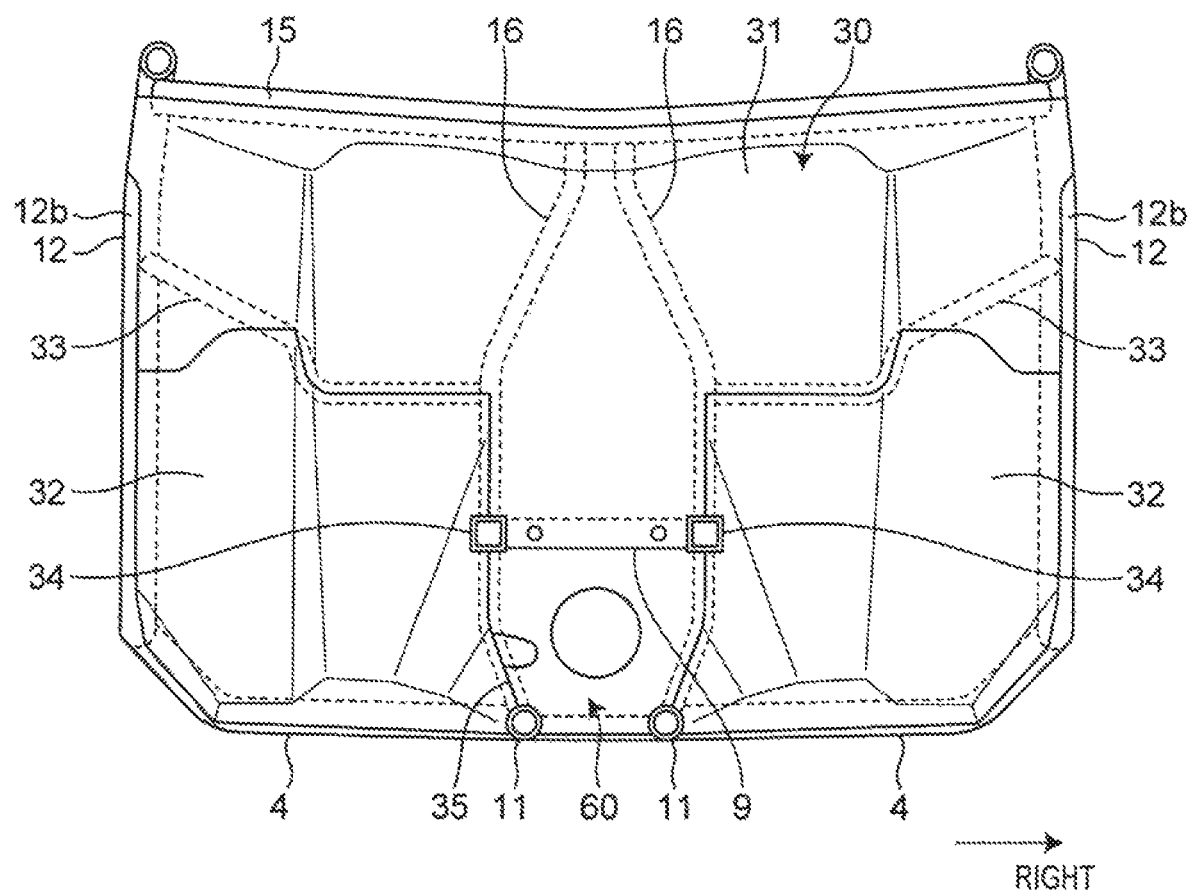
FIG. 5 is a front view of a front panel.

FIG. 3 is a front view of a front panel. As shown in FIG. 5, the utility vehicle 10 includes a front panel 30 that defines the front side of the riding space S and extends in a substantially perpendicular direction in the vertical direction. The front panel 30 includes a front upper panel 31 disposed on the upper side of the vehicle body and a front lower panel 32 disposed on the lower side of the vehicle body.

The front upper panel 31 extends in a direction substantially orthogonal to the front-rear direction. The upper end of the front upper panel 31 is attached to the front cross member 15 using a rivet or the like, and the lower end of the front upper panel 31 is attached to a sub cross member 33 using a rivet or the like. The sub cross member 33 extends in the vehicle width direction by connecting an intermediate portion in the vertical direction of the front portion 12b of the side frame 12 and an intermediate portion in the vertical direction of the front support frame 16.

The front upper panel 31 extends in the vertical direction between the front cross member 15 and the sub cross member 33. The front upper panel 31 has a center portion in the vehicle width direction at the lower end that protrudes downward in a substantially rectangular shape and extends between the left and right front support frames 16.

Figure 6:
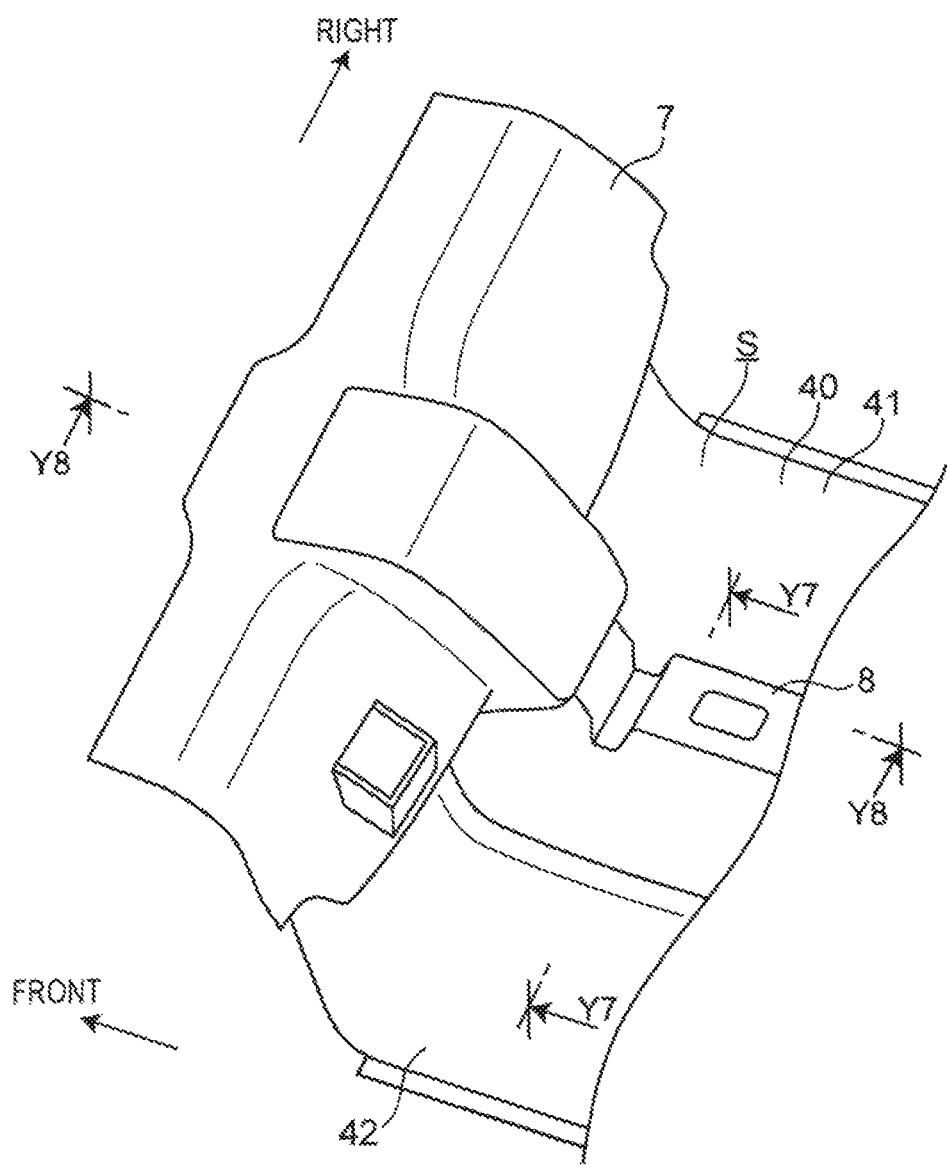
FIG. 6 is a perspective view showing a dashboard, a floor panel, and a center console of the utility vehicle.
Figure 8:
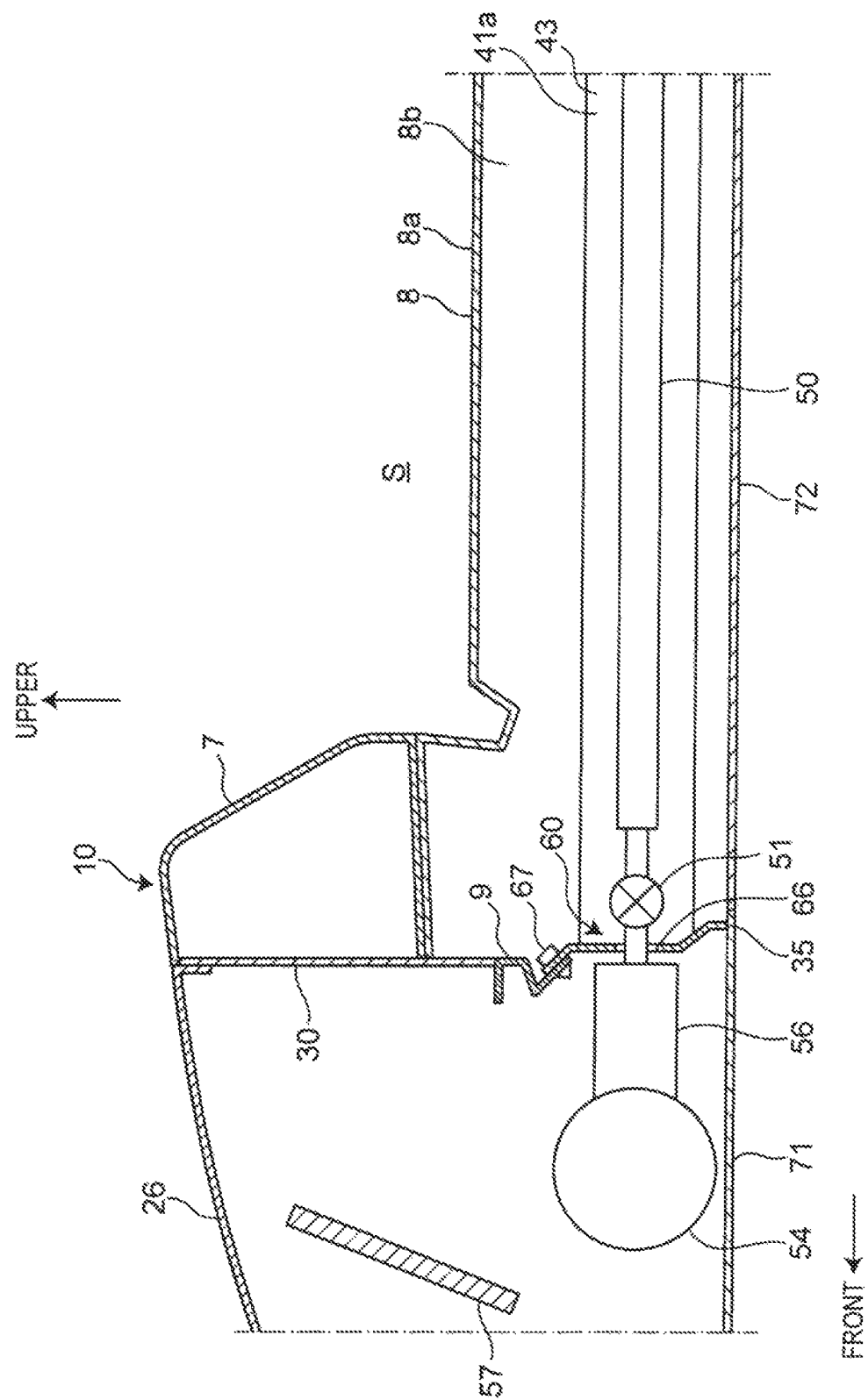
FIG. 8 is a cross-sectional view of the utility vehicle taken along line Y8-Y8 in FIG. 6.

A dashboard 7 extending in the vehicle width direction is provided on the rear side of the front upper panel 31 (see FIGS. 6 and 8). The dashboard 7 extends in the vehicle width direction, and is assembled with an operation unit, such as the steering wheel 29, and instruments, such as a speedometer.

To the left and right front support frames 16, a pair of left and right front subframes 34 extending in the front-rear direction are connected between the sub cross member 33 and the main frame 11 in the vertical direction. As shown in FIGS. 1 and 2, the front subframes 34 are provided in parallel to the main frames 11 above the left and right main frames 11 at the front of the vehicle body. The front end of the front subframe 34 is connected to the front frame 13.

The left and right front support frames 16 are attached with a connection bracket 9 that extends in the vehicle width direction by connecting the connection portions of the left and right front support frames 16 and the front subframe 34. The front upper panel 31 is attached to the connection bracket 9 at the lower end of the center portion in the vehicle width direction.

The front lower panel 32 extends in a direction substantially orthogonal to the front-rear direction. The left and right front lower panels 32 are provided as a pair. The upper and lower ends of the front lower panel 32 are respectively attached to the sub cross member 33 and the first cross member 4 using rivets or the like. The inner end and the outer end of the front lower panel 32 are respectively attached to the front support frame 16 and the side frame 12 using rivets or the like.

The left and right front lower panels 32 are disposed on the rear side of the left and right front wheels 21, respectively. The left and right front lower panels 32 are provided substantially symmetrically in the vehicle width direction. The center portion in the vehicle width direction at the lower end protruding downward the front upper panel 31 in a substantially rectangular shape is disposed on the upper side between the left and right front lower panels 32.

As shown in FIG. 8 described later, a propeller shaft 50 extending in the front-rear direction is inserted through the lower side between the left and right front lower panels 32. The front panel 30 is provided with an opening 35, which is opened toward an upper side in a substantially rectangular shape and formed by the front upper panel 31 and the front lower panel 32, in the center portion in the vehicle width direction at the lower end, and the propeller shaft 50 is inserted through the opening 35.

Figure 7:
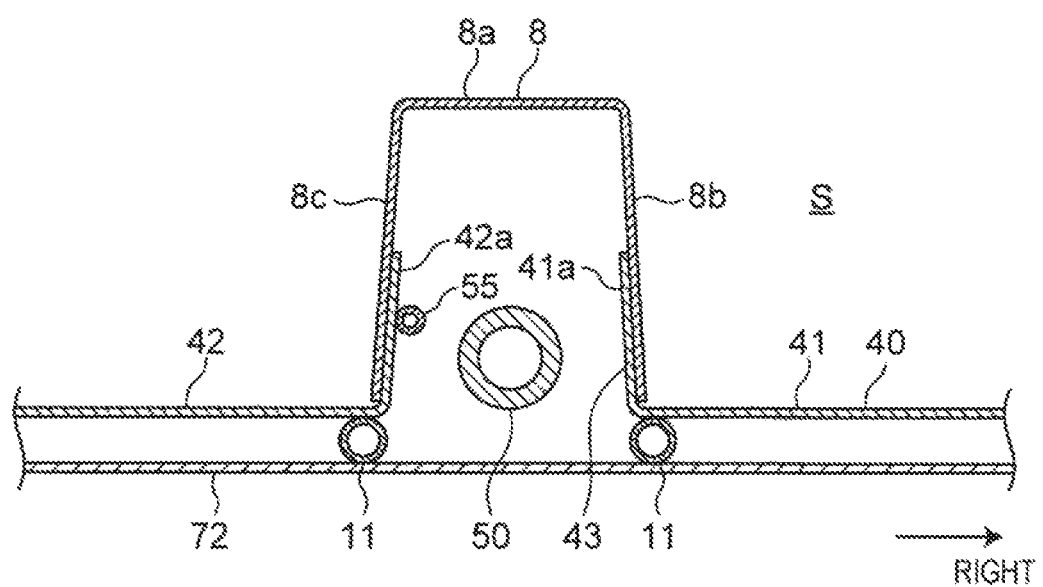
FIG. 7 is a cross-sectional view of the utility vehicle taken along line Y7-Y7 in FIG. 6.

FIG. 6 is a perspective view showing the dashboard, floor panel, and center console of the utility vehicle, FIG. 7 is a cross-sectional view of the utility vehicle taken along line Y7-Y7 in FIG. 6, and FIG. 8 is a cross-sectional view of the utility vehicle taken along line Y8-Y8 in FIG. 6. As shown in FIGS. 6 to 8, the utility vehicle 10 includes the floor panel 40 that defines the lower side of the riding space S and extends from the lower side of the front panel 30 to the rear side.

The floor panel 40 extends in a direction substantially orthogonal to the vertical direction. The front end of the floor panel 40 is attached to the first cross member 4 and connected to the lower end of the front panel 30, and the rear end of the floor panel 40 is attached to the third cross member 6 and connected to the lower end of the back panel 27.

The floor panel 40 includes a right floor panel 41 and a left floor panel 42 that are disposed to be separated in the vehicle width direction. Inner ends in the vehicle width direction of the right floor panel 41 and the left floor panel 42 are attached to the main frame 11, and outer ends in the vehicle width direction of the right floor panel 41 and the left floor panel 42 are attached to the side frames 12.

A right vertical surface portion 41a extending in the front-rear direction and extending in the vertical direction is provided at the inner end in the vehicle width direction of the right floor panel 41. A left vertical surface portion 42a extending in the front-rear direction and extending in the vertical direction is provided at the inner end in the vehicle width direction of the left floor panel 42. The right vertical surface portion 41a and the left vertical surface portion 42a are provided substantially symmetrically in the vehicle width direction.

The floor panel 40 is provided with a tunnel portion 43 that extends in the front-rear direction, is recessed upward on the center side in the vehicle width direction, and is formed by the right floor panel 41 and the left floor panel 42. The front end of the tunnel portion 43 communicates with the opening 35 of the front panel 30. An opening through which the propeller shaft 50 is inserted is provided on the center side in the vehicle width direction at the lower end of the back panel 27, and the rear end of the tunnel portion 43 communicates with the opening of the back panel 27.

The tunnel portion 43 provided on the floor panel 40 has the upper side covered with a center console 8. The center console 8 is provided between the left and right seats 28 and extends in the front-rear direction. The front end of the center console 8 is connected to the center side in the vehicle width direction of the front panel 30, and the rear end of the center console 8 is connected to the center side in the vehicle width direction of the back panel 27.

The center console 8 includes an upper surface portion 8a extending in a direction substantially orthogonal to the vertical direction, a right side surface portion 8b extending downward from the right end of the upper surface portion 8a, and a left side surface portion 8c extending downward from the left end of the upper surface portion 8a. The center console 8 has the right side surface portion 8b and the left side surface portion 8c respectively attached to the outer sides in the vehicle width direction of the right vertical surface portion 41a and the left vertical surface portion 42a of the floor panel 40 using rivets, and is provided to cover an upper side of the tunnel portion 43 of the floor panel 40. Operation units, such as a shift lever and a parking brake lever, are disposed on the center console 8.

As shown in FIG. 8, the propeller shaft 50 extending in the front-rear direction is disposed in the tunnel portion 43 provided on the floor panel 40. The propeller shaft 50 extends to the front with respect to the front panel 30 and extends to the rear with respect to the back panel 27. The propeller shaft 50 has universal joints 51 on the front side and the rear side.

The propeller shaft 50 is connected to a front wheel differential 54 disposed on the front side with respect to the front panel 30 by the universal joint 51 on the front side, and is connected to a rear wheel differential of the power unit 3 disposed on the rear side with respect to the back panel 27 by the universal joint on the rear side. The front wheel 21 is connected to the front wheel differential 54, the rear wheel 22 is connected to the rear wheel differential, and the power from the engine of the power unit 3 is transmitted to the left and right rear wheels 22 via the rear wheel differential and also to the left and right front wheels 21 via the propeller shaft 50 and the front wheel differential 54.

The front wheel differential 54 is disposed between the left and right main frames 11 and the left and right front subframes 34 on the front side with respect to the front panel 30. A drive shaft extending in the vehicle width direction is connected to the front wheel differential 54, and the front wheel 21 is attached to the drive shaft. In the utility vehicle 10, a steering angle of the front wheel 21 is set to be large.

Above the front wheel differential 54, a radiator 57 is provided on the rear side of a radiator grill provided between the left and right front frames 13. The radiator 57 radiates heat of a coolant which becomes hot at the engine and cools the coolant with the traveling wind. On the rear side of the radiator 57, air including hot air due to heat radiation of the coolant flows during traveling.

As described above, the propeller shaft 50 is connected to the front wheel differential 54. The front wheel differential 54 has an input shaft 56 extending to the rear side, and the propeller shaft 50 is connected to the input shaft 56 on the front side with respect to the front panel 30.

Figure 9:
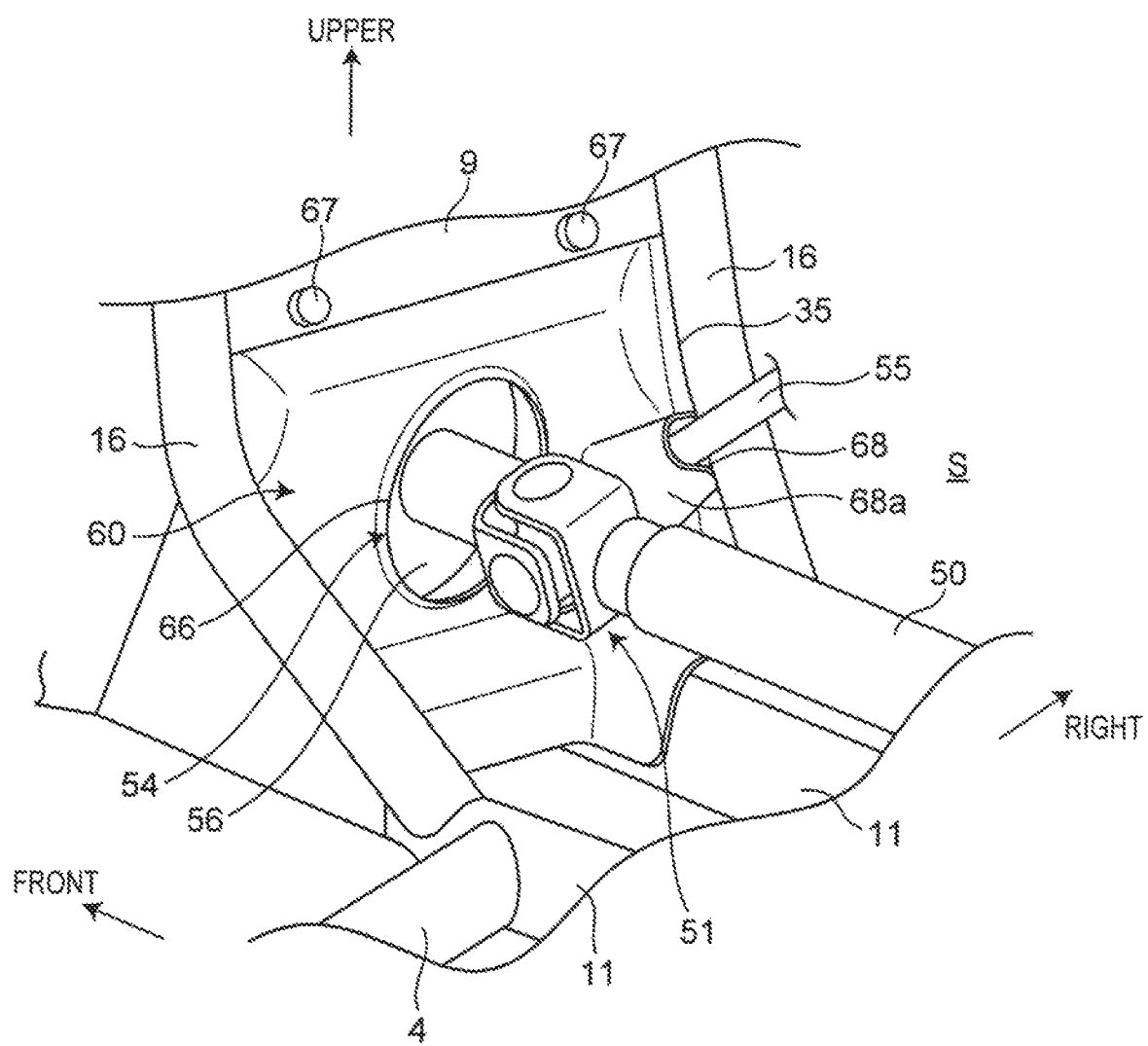
FIG. 9 is a perspective view showing a cover member attached to the vehicle body frame.
Figure 10:
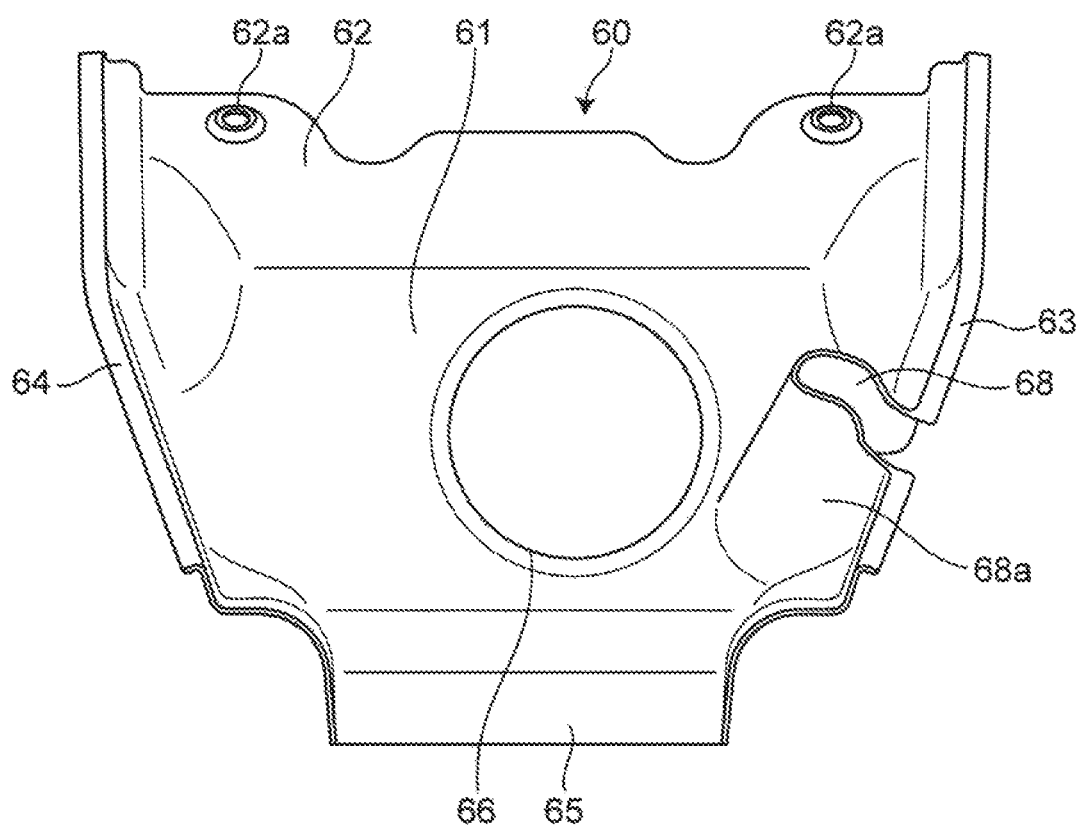
FIG. 10 is a rear view of the cover member.

FIG. 9 is a perspective view showing a cover member attached to the vehicle body frame, and FIG. 10 is a rear view of the cover member. As shown in FIGS. 9 and 10, the utility vehicle 10 is provided with a cover member 60 that covers space between the propeller shaft 50 and the tunnel portion 43 on the front side of the tunnel portion 43.

The cover member 60 is formed using a resin material, and is provided in a substantially rectangular shape so as to cover space between the left and right front support frames 16 between the main frame 11 and the connection bracket 9 in the vertical direction. The cover member 60 includes a main body portion 61 extending in a direction substantially orthogonal to the front-rear direction, an upper flange portion 62 extending from the upper end of the main body portion 61 to the front side, a right flange portion 63 and a left flange portion 64 extending to the rear side from the right and left sides in the vehicle width direction of the main body portion 61, respectively, and a lower flange portion 65 extending from the lower end of the main body portion 61 to the rear side and then downward.

In the cover member 60, a rivet insertion hole 62a is provided on the upper flange portion 62. The connection bracket 9 is provided with a rivet insertion hole in a manner corresponding to the rivet insertion hole 62a of the cover member 60. The cover member 60 is attached to the connection bracket 9 in such a manner that the upper flange portion 62 is placed on top of the connection bracket 9 and a rivet 67 is inserted into the rivet insertion hole 62a of the cover member 60 and a rivet insertion hole of the connection bracket 9.

The right flange portion 63 and the left flange portion 64 of the cover member 60 are formed along an inner side in the vehicle width direction of the front support frame 16 and are also formed along an inner side in the vehicle width direction of the main frame 11. The lower flange portion 65 of the cover member 60 is formed to extend between the left and right main frames 11.

The cover member 60 is provided so as to cover the opening 35 of the front panel 30, and is provided on the front side of the tunnel portion 43 so as to cover substantially the entire space between the propeller shaft 50 and the tunnel portion 43. The cover member 60 is provided so as to cover the opening 35 of the front panel 30, and is provided so as to be substantially flush with the front panel 30.

On the cover member 60, a shaft insertion hole 66 through which the propeller shaft 50 is inserted is formed in a center portion of the main body portion 61. As shown in FIG. 8, the shaft insertion hole 66 is formed to have a size substantially equal to that of the propeller shaft 50, and is formed in a circular shape that is smaller than the input shaft 56 of the front wheel differential 54 and larger than the propeller shaft 50.

In the utility vehicle 10, as shown in FIGS. 5 and 7, a cable 55 extending in the front-rear direction is routed in the tunnel portion 43 provided on the floor panel 40. The cable 55 extends to the front side with respect to the front panel 30 through the opening 35 of the front panel 30. On the cover member 60, a cable recess 68 into which the cable 55 is inserted in the front-rear direction and locked is formed.

The cable recess 68 is formed to be recessed inward from the right end of the cover member 60. The cable recess 68 is formed in a tubular shape with part of a peripheral wall portion 68a cut out, and the peripheral wall portion 68a extends from the main body portion 61 to the rear side. The cable 55 routed in the tunnel portion 43 extends in the front-rear direction of the cover member 60, is inserted into the cable recess 63, and is locked. The cable recess 68 is inclined in such a manner that the rear side is higher than the front side and is formed in a tapered shape so as to lock the cable 55.

As shown in FIG. 8, the utility vehicle 10 also includes a front under panel 71 that covers a lower surface of the vehicle body in the front portion of the vehicle body, a floor under panel 72 that covers the lower surface of the floor panel 40, and a rear under panel that covers the lower surface of the vehicle body in the rear portion of the vehicle body. The front under panel 71 is attached to the lower side of the front portion of the main frame 11 so as to cover the space between the main frames 11, the floor under panel 72 is attached to the lower side of the left and right side frames 12 and the main frame 11 so as to cover the space between the left and right side frames 12, and the rear under panel is attached to the lower side of the rear portion of the main frame 11 so as to cover the space between the left and right main frames 11.

As described above, the utility vehicle 10 according to the present embodiment includes the riding space S, the front panel 30 that defines the front side of the riding space S and extends in the vertical direction, the floor panel 40 that defines the lower side of the riding space S and extends from the lower side of the front panel 30 to the rear side, and is provided with the tunnel portion 43 extending in the front-rear direction on the center side in the vehicle width direction, the propeller shaft 50 that is disposed in the front-rear direction in the tunnel portion 43 and extends to the front side with respect to the front panel 30, and the cover member 60 that covers the space between the propeller shaft 50 and the tunnel portion 43 on the front side of the tunnel portion 43.

In this manner, since the front side of the tunnel portion 43 is covered by the cover member 60, a foreign matter, such as mud and stones, that is sprung by the front wheels 21 and the like during traveling can be suppressed from entering the tunnel portion 43 from the front side and accumulating. In particular, in a case where a steering angle of the front wheel 21 is large, a foreign matter can be suppressed from entering the tunnel portion 43 and accumulating. Further, an increase in the temperature of the floor panel 40 due to air including hot air from the radiator 57 on the front side flowing into the tunnel portion 43 can be suppressed, and the thermal effect on the passenger can be suppressed. Further, damage to the propeller shaft 50 due to a foreign matter, such as stones, entering the tunnel portion 43 can be suppressed.

Further, the cover member 60 is provided so as to be substantially flush with the front panel 30. In this manner, since the cover member 60 is provided substantially flush with the front panel 30, a foreign matter can be effectively suppressed from entering the tunnel portion 43 and accumulating. Further, air including hot air from the radiator 57 on the front side can be moved to an outer side in the vehicle width direction, the lower side, and the like of the front panel 30 so as to foe suppressed from flowing into the tunnel portion 43.

Further, the cover member 60 covers substantially the entire space between the propeller shaft 50 and the tunnel portion 43 on the front side of the tunnel portion 43. In this manner, the cover member 60 can effectively suppress a foreign matter from entering the tunnel portion 43 from the front side and accumulating, and also effectively suppress air including hot air from the radiator 57 on the front side from flowing into the tunnel portion 43 from the front side.

Further, the cable 55 extending in the front-rear direction is routed in the tunnel portion 43, and the cable recess 68 through which the cable 55 is inserted in the front-rear direction and locked is provided on the cover member 60. In this manner, the cable 55 can be locked using the cover member 60 without the need of separately providing a component for locking the cable 55 extending in the front-rear direction in the tunnel portion 43.

In the present embodiment, the cover member 60 is provided with the shaft insertion hole 66 and the cable recess 68. However, the cover member 60 may not be provided with the cable recess.

Further, the tunnel portion 43 provided on the floor panel 40 is covered with the center console 8 on the upper side of the tunnel portion 43. However, the tunnel portion can also be formed by the center side in the vehicle width direction of the floor panel 40 bulging upward and extending in the front-rear direction. Even in such a case, the propeller shaft 50 is disposed in the tunnel portion, and a cover member that covers the space between the propeller shaft 50 and the tunnel portion is provided on the front side of the tunnel portion.

In the present embodiment, the front under panel 71, the floor under panel 72, and the rear under panel 73 are provided as under panels that cover the lower surface of the vehicle body of the utility vehicle 10. However, under panels may not be provided.

The present invention is not limited to the illustrated embodiment, and various improvements and design changes can be made without departing from the gist of the present invention.

What is claimed is:

1. A utility vehicle comprising:
   a vehicle interior;
   a front panel defining a front side of the vehicle interior and extending in a vertical direction;
   a floor panel defining a lower side of the vehicle interior and extending from a lower side of the front panel to a rear side, and having a tunnel portion extending in a front-rear direction on a center side in a vehicle width direction;
   a propeller shaft disposed in the front-rear direction in the tunnel portion and extending to a front side with respect to the front panel; and
   a cover member covering a front side of the tunnel portion and covering a space between the propeller shaft and the tunnel portion on the front side of the tunnel portion.

2. The utility vehicle according to claim 1, wherein the cover member is substantially flush with the front panel.

3. The utility vehicle according to claim 1, wherein the cover member covers substantially an entire space between the propeller shaft and the tunnel portion on the front side of the tunnel portion.

4. The utility vehicle according to claim 1, wherein a cable extending in the front-rear direction is routed through the tunnel portion, and the cover member has a cable recess through which the cable is inserted in the front-rear direction and is locked.

5. The utility vehicle according to claim 1, wherein the cover member has a shaft insertion hole through which the propeller shaft is inserted.

6. A utility vehicle comprising:
   a vehicle interior;
   a front panel defining a front side of the vehicle interior and extending in a vertical direction;
   a floor panel defining a lower side of the vehicle interior and extending from a lower side of the front panel to a rear side, the floor panel having a tunnel portion extending in a front-rear direction on a center side in a vehicle width direction;
   a propeller shaft disposed in the front-rear direction in the tunnel portion and having a front portion extending to a front side with respect to the front panel; and
   a cover member covering a front side of the tunnel portion and covering a space between the front portion of the propeller shaft and the tunnel portion.

7. The utility vehicle according to claim 6, wherein the cover member is on the front side of the tunnel portion.

8. The utility vehicle according to claim 6, wherein the front panel has an opening opened in the front-rear direction, and the cover member covers the opening of the front panel.

9. The utility vehicle according to claim 6, wherein the cover member has a shaft insertion hole through which the propeller shaft is inserted.

10. The utility vehicle according to claim 9, further comprising a front wheel differential having an input shaft connected to the propeller shaft, the shaft insertion hole being smaller than the input shaft of the front wheel differential and larger than the propeller shaft.

11. The utility vehicle according to claim 6, further comprising a radiator at a front side with respect to the tunnel portion, the cover member being disposed behind the radiator.

12. The utility vehicle according to claim 6, wherein the propeller shaft has a universal joint, and the cover member is disposed at a front side of the universal joint.

13. A utility vehicle comprising:
    a vehicle interior;
    a front panel defining a front side of the vehicle interior and extending in a vertical direction;
    a tunnel portion extending from a lower side of the front panel to a rear side in a front-rear direction;

a propeller shaft disposed in the front-rear direction in the tunnel portion and having a front portion extending to a front side with respect to the front panel; and a cover member covering a front side of the tunnel portion and covering a space between the front portion of the propeller shaft and the tunnel portion, wherein the front panel has an opening opened in the front-rear direction, wherein the cover member covers the opening of the front panel, wherein the propeller shaft has a universal joint, and wherein the cover member is on a front side with respect to the universal joint.

* * * * *